(12) United States Patent
Marquardt et al.

(10) Patent No.: US 12,302,084 B2
(45) Date of Patent: May 13, 2025

(54) HEARING DEVICE WITH MULTIPLE NEURAL NETWORKS FOR SOUND ENHANCEMENT

(71) Applicant: STARKEY LABORATORIES, INC., Eden Prairie, MN (US)

(72) Inventors: Daniel Marquardt, Hannover (DE); Deepak Kadetotad, Tempe, AZ (US); Tao Zhang, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 368 days.

(21) Appl. No.: 17/927,239

(22) PCT Filed: May 18, 2021

(86) PCT No.: PCT/US2021/032926
§ 371 (c)(1),
(2) Date: Nov. 22, 2022

(87) PCT Pub. No.: WO2021/242570
PCT Pub. Date: Dec. 2, 2021

(65) Prior Publication Data
US 2023/0292074 A1    Sep. 14, 2023

Related U.S. Application Data

(60) Provisional application No. 63/031,943, filed on May 29, 2020.

(51) Int. Cl.
*H04S 7/00* (2006.01)
*G06N 3/08* (2023.01)
*H04R 25/00* (2006.01)

(52) U.S. Cl.
CPC ............. *H04S 7/30* (2013.01); *G06N 3/08* (2013.01)

(58) Field of Classification Search
CPC ............. H04S 7/30; G06N 3/08; H04R 25/00
(Continued)

(56) References Cited

U.S. PATENT DOCUMENTS

| 7,650,004 B2 | 1/2010 | Durant |
| 8,355,794 B2 | 1/2013 | Lineaweaver et al. |

(Continued)

FOREIGN PATENT DOCUMENTS

| CN | 105611477 | 6/2018 |
| EP | 2071875 | 7/2009 |

(Continued)

OTHER PUBLICATIONS

PCT Search Report and Written Opinion for PCT/US2021/032926 dated Aug. 25, 2021 (21 pages).
(Continued)

*Primary Examiner* — Thjuan K Addy
(74) *Attorney, Agent, or Firm* — Mueting Raasch Group

(57) ABSTRACT

An ear-wearable device stores a plurality of neural network data objects each defining a respective neural network. A sound signal received from a microphone of the ear-wearable device is digitized. An ambient environment of the digitized sound signal is classified into one of a plurality of classifications. Based on the classification, one of the neural network data objects is selected to enhance the digitized sound signal. An analog signal is formed based on the enhanced digitized sound signal. The analog signal is reproduced via a receiver of the ear-wearable device.

20 Claims, 7 Drawing Sheets

(58) Field of Classification Search
USPC .......................................... 381/303, 1, 300
See application file for complete search history.

(56) References Cited

U.S. PATENT DOCUMENTS

| | | | |
|---|---|---|---|
| 8,494,193 | B2 | 7/2013 | Zhang et al. |
| 10,575,103 | B2 | 2/2020 | Fitz et al. |
| 10,652,674 | B2 | 5/2020 | Lederman |
| 10,871,943 | B1 * | 12/2020 | D'Amato ............ H04L 12/2809 |
| 11,190,898 | B2 * | 11/2021 | Tang ...................... G06N 3/045 |
| 11,792,580 | B2 | 10/2023 | Diehl |
| 2004/0111385 | A1 | 6/2004 | Starkey |
| 2011/0137656 | A1 | 6/2011 | Xiang et al. |
| 2017/0311095 | A1 | 10/2017 | Fitz et al. |
| 2019/0132687 | A1 | 5/2019 | Santos et al. |
| 2019/0149927 | A1 | 5/2019 | Zhang et al. |
| 2020/0059740 | A1 | 2/2020 | Xu et al. |
| 2020/0260198 | A1 | 8/2020 | Andersen et al. |

FOREIGN PATENT DOCUMENTS

| | | |
|---|---|---|
| EP | 3514792 | 7/2019 |
| EP | 3806496 | 4/2021 |
| GB | 2456297 | 7/2009 |

OTHER PUBLICATIONS

Healy et al., "An Alogorithmm to Improve Speech Recognition in Noise for Hearing-Impaired Listeners", The Journal of the Acoustical Society of America, American Institute of Physics for the Acoustical Society of America, New York, NY, vol. 134, No. 4, Oct. 4, 2013, pp. 3029-3038.

* cited by examiner

HEARING DEVICE WITH MULTIPLE NEURAL NETWORKS FOR SOUND ENHANCEMENT

RELATED PATENT APPLICATIONS

This application is a U.S. National Stage application under 35 U.S.C. 371 of PCT Application No. PCT/US2021/032926 filed May 18, 2021, which claims the benefit of U.S. Provisional Application No. 63/031,943, filed May 29, 2020, the entire contents of which are hereby incorporated by reference.

SUMMARY

This application relates generally to ear-wearable electronic systems and devices, including hearing aids, personal amplification devices, and hearables. In one embodiment, methods and ear-wearable devices are described that facilitate storage of a plurality of neural network data objects each defining a respective neural network. A sound signal received from a microphone of the ear-wearable device is digitized. An ambient environment of the digitized sound signal is classified into one of a plurality of classifications. Based on the classification, one of the neural network data objects to enhance the digitized sound signal. An analog signal is formed based on the enhanced digitized sound signal. The analog signal is reproduced via a receiver of the ear-wearable device. In some embodiments, a system includes a network service and the ear-wearable device, the ear-wearable device having a data interface that allows the ear-wearable device to receive data from the network service. In the system, the data interface facilitates updating or replacement of the plurality of plurality of neural network data objects.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below makes reference to the following figures.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
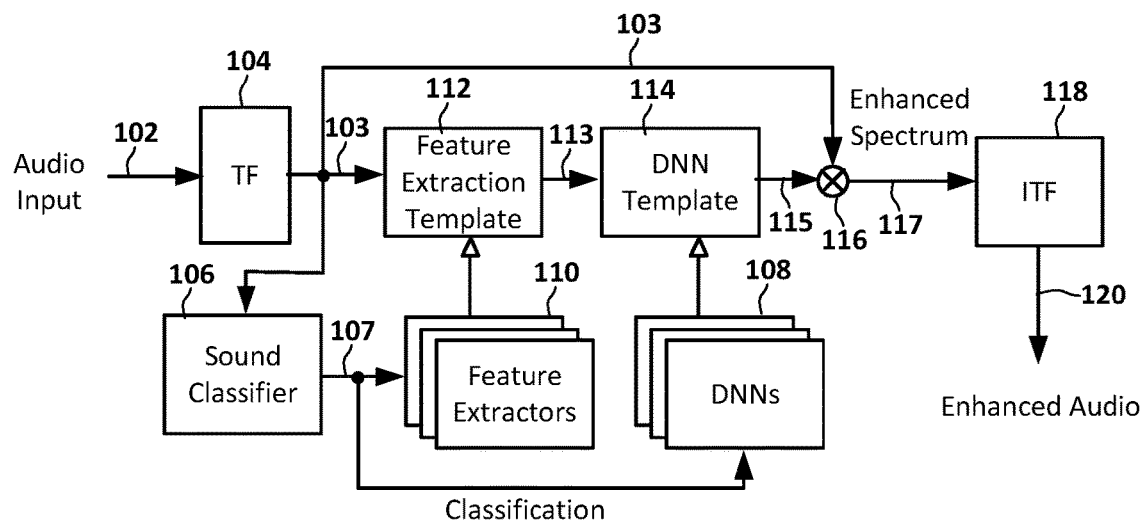
FIG. 1 is a schematic diagram of an audio processing path according to an example embodiment.

Embodiments disclosed herein are directed to speech enhancement in an ear-worn or ear-level electronic device. Such a device may include cochlear implants and bone conduction devices, without departing from the scope of this disclosure. The devices depicted in the figures are intended to demonstrate the subject matter, but not in a limited, exhaustive, or exclusive sense. Ear-worn electronic devices (also referred to herein as "hearing devices" or "ear-wearable devices"), such as hearables (e.g., wearable earphones, ear monitors, and earbuds), hearing aids, hearing instruments, and hearing assistance devices, typically include an enclosure, such as a housing or shell, within which internal components are disposed.

Typical components of a hearing device can include a processor (e.g., a digital signal processor or DSP), memory circuitry, power management and charging circuitry, one or more communication devices (e.g., one or more radios, a near-field magnetic induction device), one or more antennas, one or more microphones, buttons and/or switches, and a receiver/speaker, for example. Hearing devices can incorporate a long-range communication device, such as a Bluetooth® transceiver or other type of radio frequency (RF) transceiver.

The term hearing device of the present disclosure refers to a wide variety of ear-level electronic devices that can aid a person with impaired hearing. The term hearing device also refers to a wide variety of devices that can produce processed sound for persons with normal hearing. Hearing devices include, but are not limited to, behind-the-ear (BTE), in-the-ear (ITE), in-the-canal (ITC), invisible-in-canal (IIC), receiver-in-canal (MC), receiver-in-the-ear (RITE) or completely-in-the-canal (CIC) type hearing devices or some combination of the above. Throughout this disclosure, reference is made to a "hearing device" or "ear-wearable device," which are used interchangeably and understood to refer to a system comprising a single left ear device, a single right ear device, or a combination of a left ear device and a right ear device.

Speech enhancement (SE) is an audio signal processing technique that aims to improve the quality and intelligibility of speech signals corrupted by noise. Due to its application in several areas such as automatic speech recognition (ASR), mobile communication, hearing aids, etc., several methods have been proposed for SE over the years. Recently, the success of deep neural networks (DNNs) in automatic speech recognition led to investigation of DNNs for noise suppression for ASR and speech enhancement. Generally, corruption of speech by noise is a complex process and a complex non-linear model like DNN is well suited for modeling it.

The present disclosure includes descriptions of embodiments that utilize a DNN to enhance sound processing. Although in hearing devices this commonly involves enhancing the user's perception of speech, such enhancement techniques can be used in specialty applications to enhance any type of sound whose signals can be characterized, such as music, animal noises (e.g., bird calls), machine noises, pure or mixed tones, etc. Generally, the embodiments use simplified DNN models that can operate effectively on devices that have practical limitations on power, processing capability, memory storage, etc.

In FIG. 1, a schematic diagram shows a sound enhancement processing path according to an example embodiment. The system receives an input signal 102, which is a time-domain audio signal that is typically digitized. The input signal 102 is converted to a frequency domain signal 103, e.g., using a time-frequency (TF) transform 104 such as a fast-Fourier transform (FFT). This frequency domain signal 103 is analyzed and subject to enhancement by a DNN as described below.

A sound classifier 106 analyzes various combinations of features of the frequency domain signal 103 (e.g., periodicity strength measurements, high-to-low-frequency, energy ratio, spectral slopes in various frequency regions, average spectral slope, overall spectral slope, spectral shape-related features, spectral centroid, omni signal power, directional signal power, energy at a fundamental frequency) and classifies 107 the current signal into one of a plurality of categories. The categories may be based on such characteristics as strength and character of background noise, reverberation/echo, power spectral density, etc. Further details on sound classification methods are described in commonly-owned U.S. Patent Publication 2011/0137656 and U.S. Pat. No. 8,494,193.

The classification 107 from the sound classifier 106 is used to select one of a plurality of simplified DNN models 108 that have been trained to provide sound enhancement for the particular classification 107. Generally, each of the DNN models 108 take as inputs a selected (and possibly different) set of features from the frequency domain signal 103. Thus in addition to selecting a particular DNN, the classification 107 is also used to select from a set of feature extractors 110, which generally define the features required for a particular one of the DNNs 108.

In the illustrated example, the ability to change DNNs based on a sound classification is indicated by feature extraction template 112 and DNN template 114. Generally, these templates 112, 114 indicate an abstract function that can be instantiated at run time with a particular implementation. The feature extraction template 122, when instantiated, will be used to set up the necessary processing operations, e.g., extraction of features 113 from a selected set of frequency bands, as well as the pipelines to feed the extracted features 113 into the selected DNN model. The DNN template 114, when used to instantiate a classifier-specific DNN, will load pre-trained weights and biases into memory, and make the necessary connections to receive the instantiated features 113 as one or more data streams, as well as set the output stream(s) to the appropriate signal processing elements.

It will be understood that the illustrated templates 112, 114 are just one example of how multiple DNNs may be used in a hearing device, and other programming paradigms may be used to implement the indicated functionality. Also, other features may be abstracted if such features change with a selected DNN. For example, if different DNNs 108 have different output vectors, then an output vector abstraction similar to the feature abstraction template 112 may be used to process and stream the output data downstream. Also, changing the DNN may trigger changes to other processing elements not shown, such as equalization, feedback cancellation, etc.

Generally, the selected DNN that is loaded via the DNN template 114 processes the extracted features 113 and provides output data 115 that are combined with the frequency-domain data stream 103 as indicated by combination block 116. For example, the output 115 may include at least a series of spectral weights that are applied to different frequency bands across the spectrum. The spectral weights are multiplied with the frequency domain audio signal 103 to enhance speech (or any other targeted audio feature) and/or attenuate noise. The resulting enhanced spectrum 117 is inverse-transformed back into the time domain, e.g., using inverse TF (ITF) block 118. The output of the ITF block 118 is an enhanced audio signal 120, e.g., enhanced to emphasize speech. This signal 120 can be processed as known in the art, e.g., converted from digital to analog, amplified, and turned into sound waves via a receiver/loudspeaker.

Figure 2:
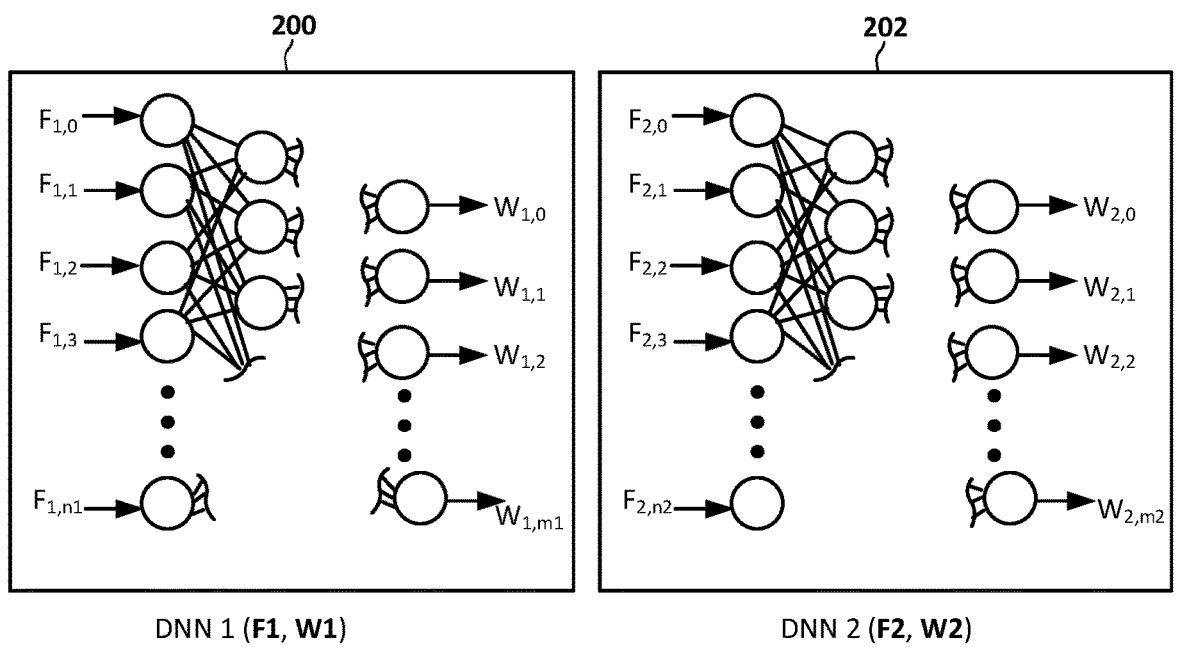
FIG. 2 is a block diagram showing multiple neural networks usable in a hearing device according to an example embodiment.

In FIG. 2, a block diagram shows an example of multiple neural networks that may be used with a processing path as shown in FIG. 1. In this example, two DNNs 200, 202 are shown that may be used for sound enhancement. Each DNN 200, 202 may have a unique input feature vector F1, F2, and output vector W1, W2. The size of these vectors affects the size of the resulting network 200, 202 and also affects any upstream or downstream processing components that are coupled to the networks 200, 202.

The networks 200, 202 may also have other differences that are not reflected in the input and output vectors. For example, the number and type of hidden layers within each neural network 200, 202 may be different. The type of neural networks 200, 202 may also be different, e.g., feedforward, (vanilla) recurrent neural network (RNN), long short-term memory (LSTM), gated recurrent units (GRU), light gated recurrent units (LiGRU), convolutional neural network (CNN), spiking neural networks, etc. These different network types may involve different arrangements of state data in memory, different processing algorithms, etc.

Figure 3A:
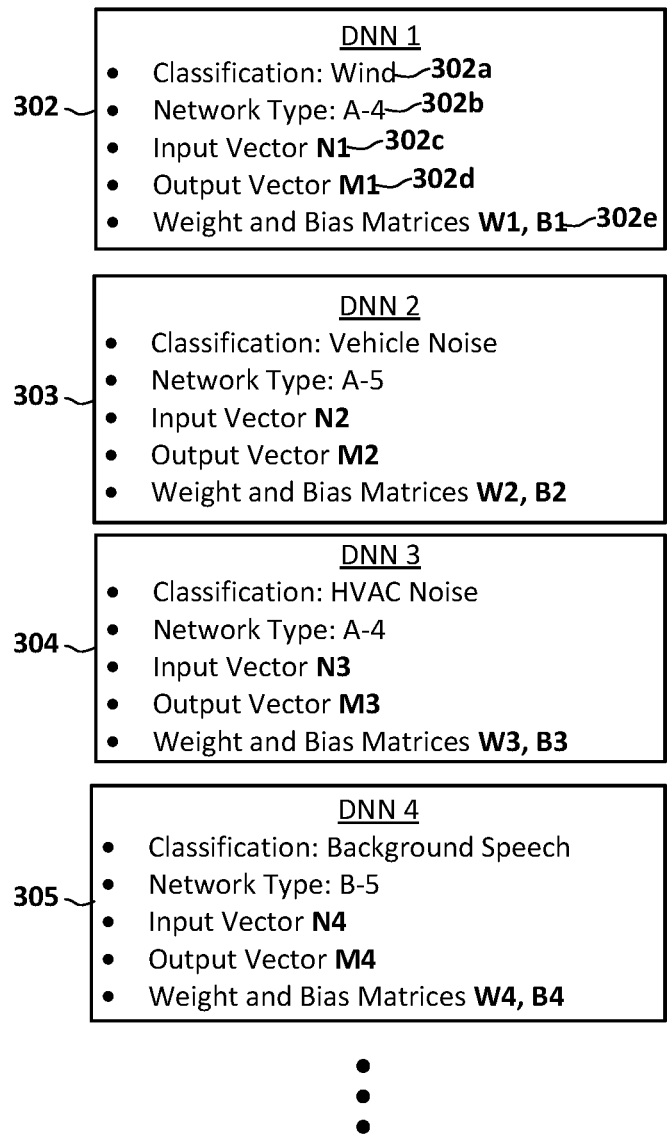
FIG. 3A is a diagram showing example neural network data structures according to an example embodiment.

In FIG. 3A, a diagram shows different types of data that may be stored on a non-volatile memory to instantiate different types of deep neural networks according to an example embodiment. Each block 302-305 represents data that may be used to dynamically instantiate and use a DNN based on a current sound context (e.g., acoustic scene). Using block 302 as a representative example, the data includes a classification 302a that would match a classification provided from a sound classifier, e.g., classifier 106 in FIG. 1. In the example of FIG. 3, the classifications are based on commonly-encountered types of background noises, but other classifications may be used.

Data 302b in block 302 indicates a type of network. Although the networks are generally DNNs, there may be many variations within that classification. In this example the letter 'A' indicates a type of network, e.g., feedforward, RNN, CNN, etc. The number '4' indicates a number of hidden layers. There may be more complicated classifications for some network types. For example, CNNs may have hidden layers that include both pooling layers and fully connected layers.

The data 302c-d represent input and output vectors. This data 302c-d is generally metadata that is used by other parts of the processing stream to input data to the DNN and output data from the DNN. The data 302c-d will at least include a number of inputs (the size of the vectors), the format of data (e.g., real values from 0.0-1.0, binary values, integers from 0-255, etc.), the type (e.g., log spectral amplitude for band X) and order of the data within the vectors that are input to and output from the DNN.

Finally, data 302e includes matrices (or some other data structure) that store weights, biases, and other state data associated with each the network elements (e.g., sigmoid neurons). These matrices 392e represent the "intelligence" of the network, and are determined in a training phase using test data. Generally, the test data is "selected to highlight the audio components that should be emphasized (e.g., speech)

in the output signal and the components (e.g., noise) that should be attenuated. The training involves inputting the test data to an initialized network (e.g., weights and biases of the neurons set to random values) and comparing the output with a reference to determine errors in the output. For example, the same voice signal can be recorded using high and low SNR paths (e.g., adding naturally occurring or artificially generated noise in the latter case), the former being used as the reference and the latter as the test data. The errors are used to adjust state variables of the network (e.g., weights and biases in the neurons) and the process repeated until the neural network achieves some level of accuracy or other measure of performance. The training may also involve pruning and quantization of the DNN model, which helps reduce the computation resources used in running the model in a hearing device.

Generally, quantization involves using smaller representations of the data used to represent the elements of the neural network. For example, values may be quantized within a −1 to 1 range, with weights quantized to 8-bit values and activations quantized to 16-bit values. Equation (1) below shows a linear quantization according to an example embodiments. Custom quantization layers can be created to quantize all weight values during feedforward operation of the network.

$$\text{Linear Quantization}(x, \text{bitwidth}) = \text{Clip}\left(\frac{\text{round}\left(x \times 2^{bitwidth-1}\right)}{2^{bitwidth-1}}, -1, \frac{2^{bitwidth-1}-1}{2^{bitwidth-1}}\right) \quad (1)$$

Figure 3B:
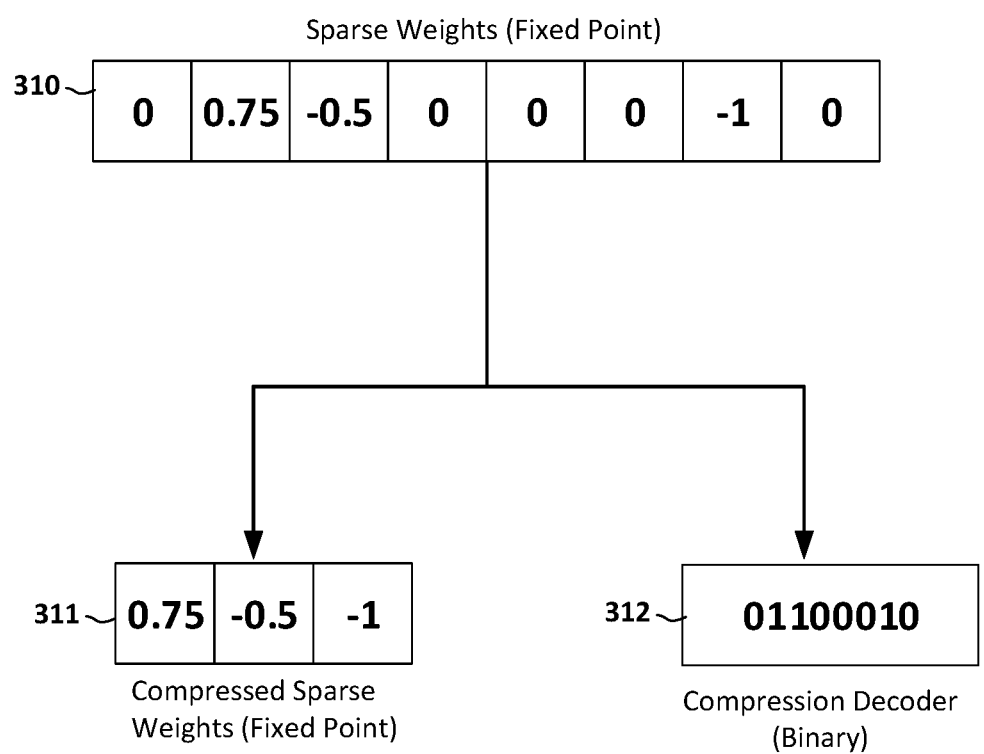
FIG. 3B is a diagram showing data structures used in pruning of a neural network according to an example embodiment.

Weights and biases can be pruned using threshold-based pruning that removes lower magnitude weights, e.g., with a magnitude close to zero for both positive and negative numbers. Percentages used in the threshold based pruning can set to acquire a target weight sparsity during training. As seen in FIG. 3B, an example set of eight weights 310 is shown to which pruning has been applied, resulting in three non-zero weights. This allows compressing the representation of the weights in storage, as well as reducing the memory footprint and number of computations involved in running the DNN. For example, the three non-zero values can be stored in just three memory locations instead of eight as sparse representation 311. Further, any DNN nodes with zero weights need not be instantiated in the DNN. An 8-bit block decoder data 312 is associated with the sparse representation 311. Each '1' in the data 312 indicates where in the original representation 310 that the numbers stored in the compressed representation 311 belong, in order from left to right.

Because the test data used to train the networks are selected to be in narrowly-defined audio categories, more simplified DNN models can be used to enhance sound within those environments. This allows reducing the memory and processing resources consumed by the data objects (e.g., objects 302-305 shown in FIG. 3A), while still achieving good levels of performance under operating conditions similar to what was used in training the models. When a change in the auditory environment is detected, a different data object 302-305 can be loaded into memory in place of a currently used object 302-305, and the signal processing path will switch to this new object for sound enhancement.

Figure 4:
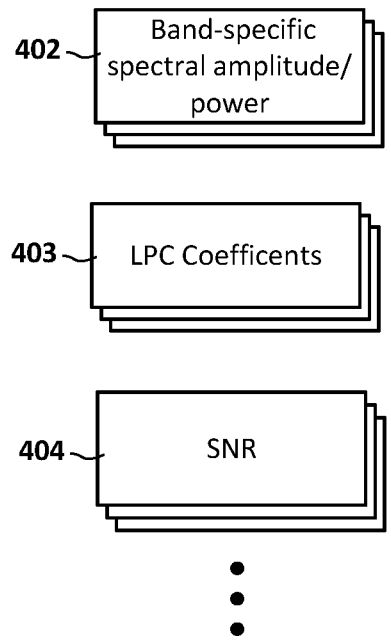
FIG. 4 is a diagram showing examples of neural network input features according to an example embodiment.

When building and training DNN models, the system designer may have a number of features derived from the audio stream to use as inputs to the models. Generally, the fewer the input features, the smaller the DNN, and therefore careful selection of input features can realize compact but effective enhancement models. In FIG. 4, a diagram shows an example of features that may be used in sound enhancement DNNs according to an example embodiment.

One set of features that is commonly used in sound enhancement is indications of amplitude and/or power 402 of various bands across the frequency range of the audio signal. Speech will generally occur within particular regions of the frequency range, while noise may occur over other ranges, the noise generally changing based on the ambient conditions of the user. In response, the sound enhancing DNN may act as a set of filters that emphasize the desired components while de-emphasizing the noise. Some environments may use a different number of bands within the frequency range of the signals, as well as bands that having different frequency extents.

With regards to speech, a hearing device may implement linear predictive coding (LPC) which analyzes the audio stream and extracts parameters related to the spectral envelope of speech in the signals. The LPC coding produces coefficients 403 that describe the speech signal in a compact format. Thus for speech enhancement DNNs, the LPC coefficients 403 may be used as inputs to the DNN. The hearing device may also have an estimator for current signal to noise ratio (SNR) 404, which may be calculated for different sub-bands. The SNR 404 may also provide useful information to a sound enhancement DNN under some conditions.

Figure 5:
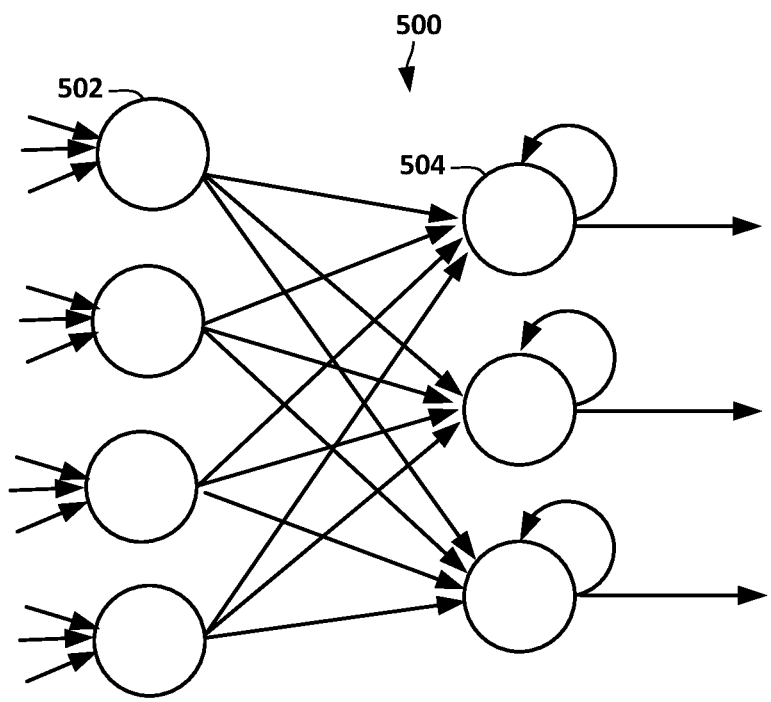
FIG. 5 is a block diagram of a recurrent neural network according to an example embodiment.

As described above, different types of neural networks may be deployed for different classifications of ambient acoustic conditions. The examples shown in FIG. 2, for example, are illustrated as feedforward neural networks. Another type of neural network useful for time-varying data is an RNN. An example of an RNN 500 is shown in FIG. 5. In addition to traditional neurons 502 that "fire" when the combination of inputs reaches some criterion, the RNN includes neurons 504 with a memory that takes into account previously processed data in addition to the current data being fed through the network. Examples of RNN nodes 504 include LSTM, GRU and LiGRU nodes which have been shown to be useful for such tasks as speech recognition.

Another type of DNN that may be used in the applications described herein is known as a spiking neural network. Spiking neural networks are a type of artificial neural networks that closely mimic the functioning of biological neurons to the extent of replica ng communication through the network via spikes once a neuron's threshold is exceeded. They incorporate the concept of time into their operating model and are asynchronous in nature. This allows spiking neural networks to be suitable for low-power hardware implementations.

Figure 6:
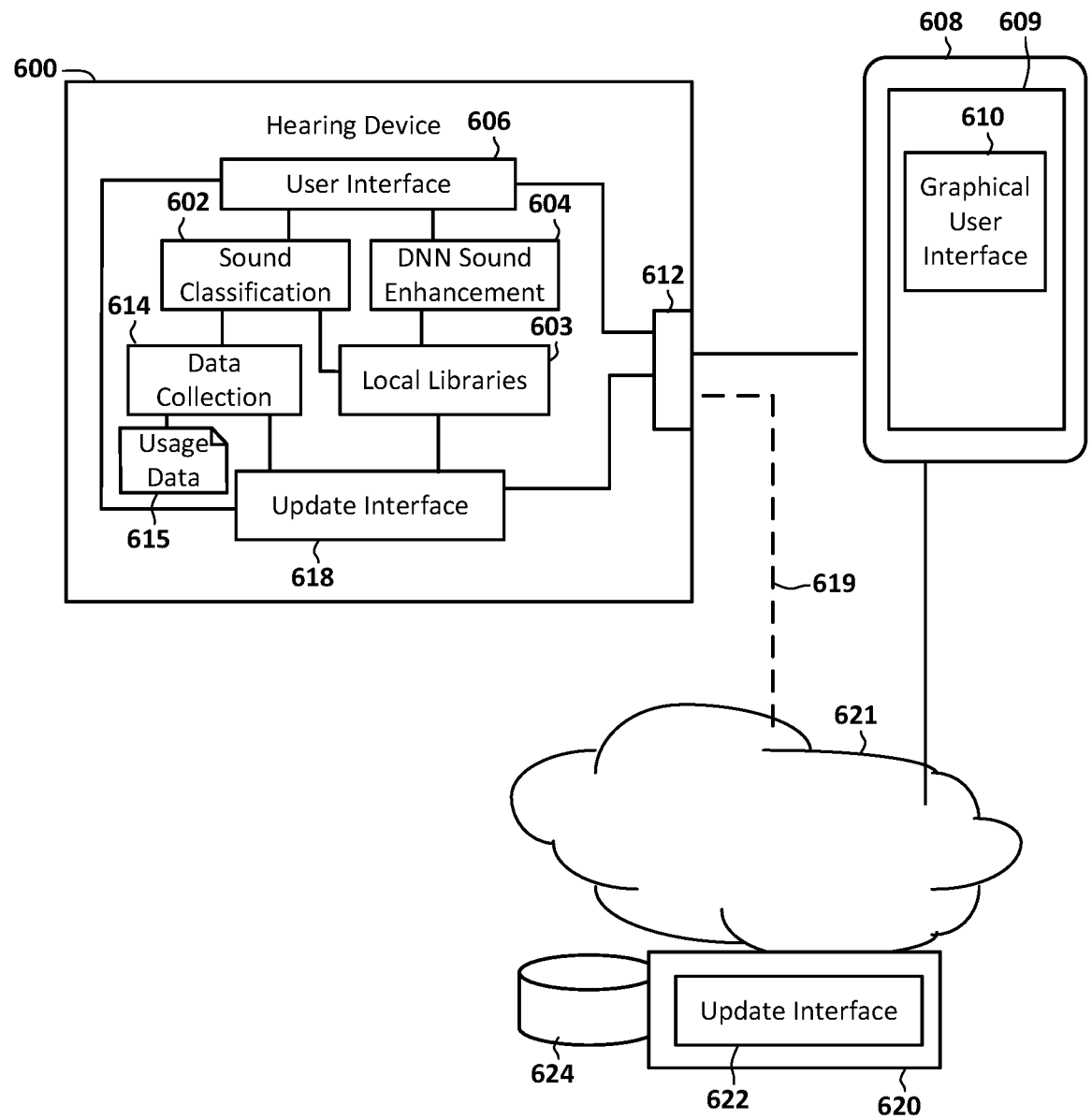
FIG. 6 is a block diagram of a system according to an example embodiment.

The use of swappable DNN models within a hearing device may have other advantages besides reducing the necessary computing resources. For example, a framework with generic interfaces as described above can be more easily modify the DNNs and related components in fielded devices compared to, for example, a firmware update. The stored DNN templates can be updated through firmware updates when new and/or improved DNN versions are developed. In FIG. 6, a block diagram shows a system for updating DNN models according to an example embodiment. A hearing device 600 includes a sound classifier 602 and DNN sound enhancer 604 as described elsewhere herein. The DNN sound enhancer 604 may select different DNN data (e.g., input/output streams, network weights) from a library 603 based on signals from the classifier 602.

The hearing device 600 also includes a user interface 606 that allows a user to change settings used by the sound classifier 602 and DNN sound enhancer 604. The user interface 606 may be programmatically accessed by an external device, such as mobile device 608, which has a touchscreen 609 that displays a graphical user interface 610. The mobile device 608 communicates with the hearing device 600 via a data interface 612, e.g., Bluetooth, USB, etc. The graphical user interface 610 may allow the user to enable/disable the DNN sound enhancer 604, enable/disable various acoustic scenes available to the classifier 602, etc. The graphical user interface 610 may also allow the user to update the models used in sound classification and enhancement, including the ability to gather test data generated by the hearing device 600.

As shown in FIG. 6, a data collection module 614 may be used to collect audio and/or statistical data 615 related to the use and effectiveness of the sound enhancement 604. This usage data 615 may include automatically collected data such as types of classifications detected by classifier 602, measurements of the effectiveness of the enhancer 604, data input by the user via user interface 606 (e.g., problems noted, ratings on effectiveness, etc.). The usage data 615 may be sent, with the user's consent, to a network service 620 via a wide area network 621 (e.g., the Internet). Note that generally the mobile device 608 may intermediate communications between the hearing device 600 and the service 620, although as indicated by dashed line 619 it may be possible for the hearing device 600 to connect directly to the service 620, e.g., via an Internet connected charging cradle.

The service 620 may examine the performance of fielded units to indicate the success of different DNNs used by the enhancer 604. The usage data 615 can stored in a data store 624 be used to modify or updated the trained models to provide improved performance. Update interfaces 618, 622 on the hearing device 600 and service 620 may facilitate updating DNN models stored in the library 603, as well as other components such as the classifier 602. These updates may be stored remotely in data store 624, and be pushed out to subscribers by the service 620 via the interface 622. In some embodiments, the usage data 615 may be used to create custom DNN models specific to the environments encountered by a particular user. Such updates may be managed by the user via the user interface 606.

Figure 7:
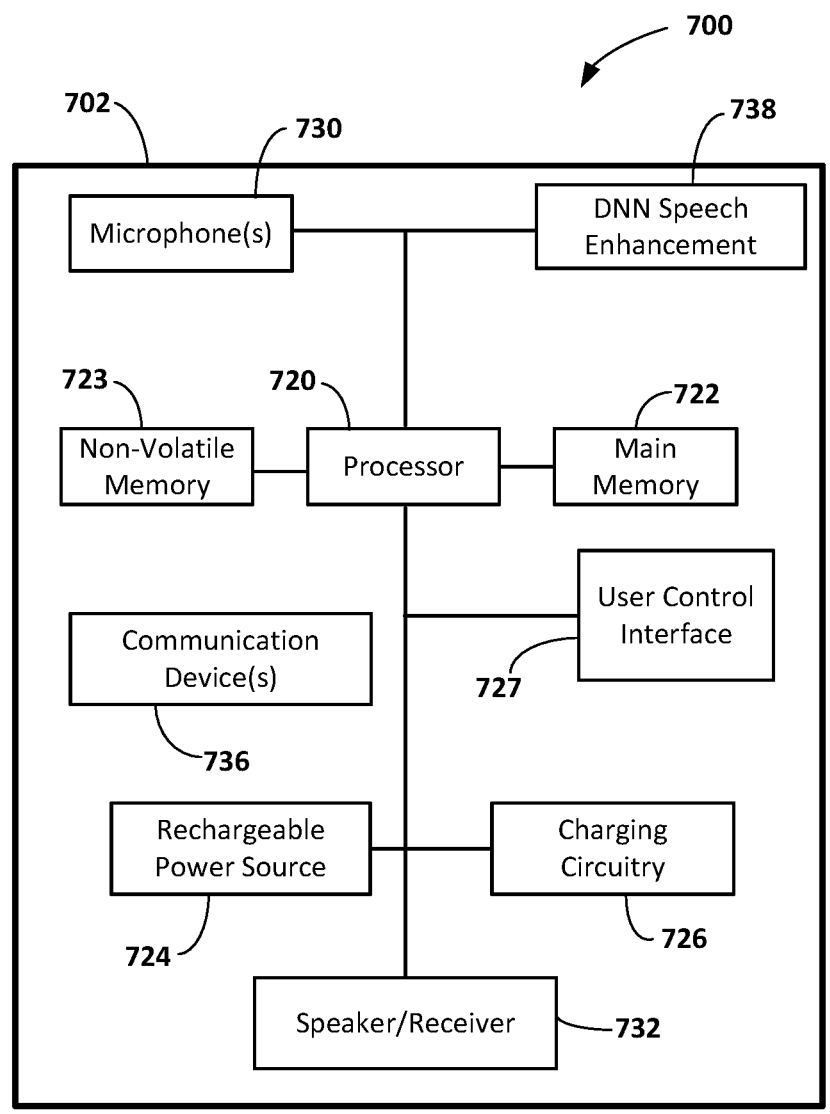
FIG. 7 is a block diagram of a hearing device according to an example embodiment.

In FIG. 7, a block diagram illustrates hardware of an ear-worn electronic device 700 in accordance with any of the embodiments disclosed herein. The device 700 includes a housing 702 configured to be worn in, on, or about an ear of a wearer. The device 700 shown in FIG. 7 can represent a single hearing device configured for monaural or single-ear operation or one of a pair of hearing devices configured for binaural or dual-ear operation. The device 700 shown in FIG. 7 includes a housing 702 within or on which various components are situated or supported. The housing 702 can be configured for deployment on a wearer's ear (e.g., a behind-the-ear device housing), within an ear canal of the wearer's ear (e.g., an in-the-ear, in-the-canal, invisible-in-canal, or completely-in-the-canal device housing) or both on and in a wearer's ear (e.g., a receiver-in-canal or receiver-in-the-ear device housing).

The hearing device 700 includes a processor 720 operatively coupled to a main memory 722 and a non-volatile memory 723. The processor 720 can be implemented as one or more of a multi-core processor, a digital signal processor (DSP), a microprocessor, a programmable controller, a general-purpose computer, a special-purpose computer, a hardware controller, a software controller, a combined hardware and software device, such as a programmable logic controller, and a programmable logic device (e.g., FPGA, ASIC). The processor 720 can include or be operatively coupled to main memory 722, such as RAM (e.g., DRAM, SRAM). The processor 720 can include or be operatively coupled to non-volatile (persistent) memory 723, such as ROM, EPROM, EEPROM or flash memory. As will be described in detail hereinbelow, the non-volatile memory 723 is configured to store instructions that facilitate using a DNN based sound enhancer.

The hearing device 700 includes an audio processing facility operably coupled to, or incorporating, the processor 720. The audio processing facility includes audio signal processing circuitry (e.g., analog front-end, analog-to-digital converter, digital-to-analog converter, DSP, and various analog and digital filters), a microphone arrangement 730, and a speaker or receiver 732. The microphone arrangement 730 can include one or more discrete microphones or a microphone array(s) (e.g., configured for microphone array beamforming). Each of the microphones of the microphone arrangement 730 can be situated at different locations of the housing 702. It is understood that the term microphone used herein can refer to a single microphone or multiple microphones unless specified otherwise.

The hearing device 700 may also include a user interface with a user control interface 727 operatively coupled to the processor 720. The user control interface 727 is configured to receive an input from the wearer of the hearing device 700. The input from the wearer can be any type of user input, such as a touch input, a gesture input, or a voice input. The user control interface 727 may be configured to receive an input from the wearer of the hearing device 700 such as shown in FIG. 6.

The hearing device 700 also includes a DNN speech enhancement module 738 operably coupled to the processor 720. The DNN speech enhancement module 738 can be implemented in software, hardware, or a combination of hardware and software. The DNN speech enhancement module 738 can be a component of, or integral to, the processor 720 or another processor coupled to the processor 720. The DNN speech enhancement module 738 is configured to provide enhanced sound using a set of machine learning models.

According to various embodiments, the DNN speech enhancement module 738 includes a plurality of neural network data objects each defining a respective neural network. The neural network data objects are stored in the persistent memory 723. The module 738 includes or utilizes a classifier that classifies an ambient environment of a digitized sound signal into one of a plurality of classifications. A neural network processor of the DNN speech enhancement module 738 selects one of the neural network data objects to enhance the digitized sound signal based on the classification. Other signal processing modules of the device 702 form an analog signal based on the enhanced digitized sound signal, the analog signal being reproduced via the receiver 732.

The hearing device 700 can include one or more communication devices 736 coupled to one or more antenna arrangements. For example, the one or more communication devices 736 can include one or more radios that conform to an IEEE 802.11 (e.g., WiFi®) or Bluetooth® (e.g., BLE, Bluetooth® 4. 2, 5.0, 5.1, 5.2 or later) specification, for example. In addition, or alternatively, the hearing device 700 can include a near-field magnetic induction (NFMI) sensor (e.g., an NFMI transceiver coupled to a magnetic antenna) for effecting short-range communications (e.g., ear-to-ear communications, ear-to-kiosk communications).

The hearing device 700 also includes a power source, which can be a conventional battery, a rechargeable battery (e.g., a lithium-ion battery), or a power source comprising a supercapacitor. In the embodiment shown in FIG. 5, the hearing device 700 includes a rechargeable power source 724 which is operably coupled to power management circuitry for supplying power to various components of the hearing device 700. The rechargeable power source 724 is coupled to charging circuitry 726. The charging circuitry 726 is electrically coupled to charging contacts on the housing 702 which are configured to electrically couple to corresponding charging contacts of a charging unit when the hearing device 700 is placed in the charging unit.

Figure 8:
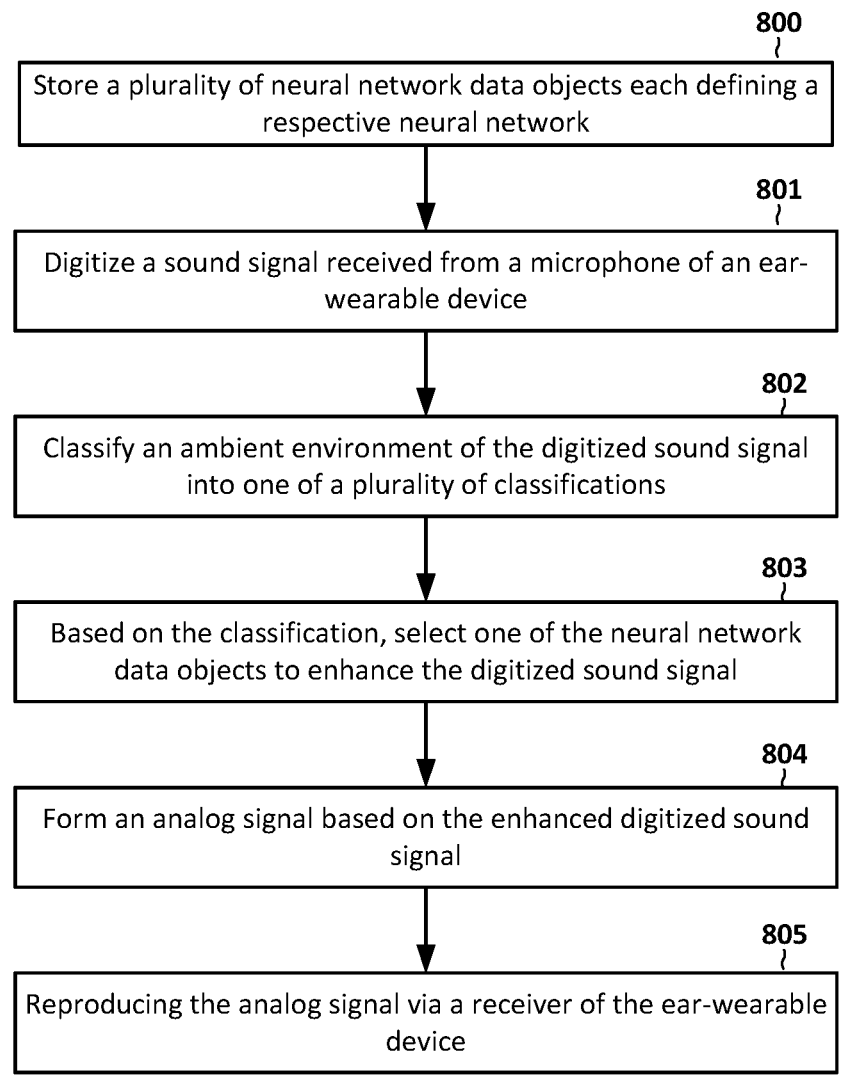
FIG. 8 is a flowchart of a method according to an example embodiment.

In FIG. 8, a flowchart shows a method according to an example embodiment. Generally, the method can be implemented within an infinite loop in a hearing device. The method involves storing 800 (e.g., on a persistent data storage of an ear-wearable device) a plurality of neural network data objects each defining a respective neural network. A sound signal received from a microphone of the ear-wearable device digitized 801. An ambient environment of the digitized sound signal is classified 802 into one of a plurality of classifications. Based on the classification, one of the neural network data objects is selected 803 to enhance the digitized sound signal. An analog signal is formed 804 based on the enhanced digitized sound signal. The analog signal is reproduced 805 via a receiver of the ear-wearable device.

This document discloses numerous embodiments, including but not limited to the following:

Embodiment 1 is an ear-wearable device, comprising: a persistent memory storing a plurality of neural network data objects each defining a respective neural network; a classifier that classifies an ambient environment of a digitized sound signal into one of a plurality of classifications; a neural network processor that, based on the classification, selects one of the neural network data objects to enhance the digitized sound signal; and a second signal processing module that forms an analog signal based on the enhanced digitized sound signal, the analog signal being reproduced via a receiver of the ear-wearable device.

Embodiment 2 includes the ear-wearable device of embodiment 1, wherein at least two of the respective neural networks uses a different input feature set, the ear-wearable device further comprising a feature processor that extracts a different input feature set from the digitized sound signal based on the classification and inputs the different input feature set to the selected neural network data object.

Embodiment 3 includes the ear wearable device of embodiment 1 or 2, further comprising: a transform processor that converts the digitized sound signal into a frequency domain signal, the classifier and neural network processor operating on the frequency domain signal, the neural network processor producing an enhanced spectrum frequency domain signal; and an inverse transform processor that converts the enhanced frequency domain signal to the enhanced digitized sound signal.

Embodiment 4 includes the ear-wearable device of any of embodiments 1-3, wherein the neural network enhances speech of the digitized sound signal.

Embodiment 5 includes the ear-wearable device of any of embodiments 1-4, wherein at least two of the neural network data objects define different types of neural networks.

Embodiment 6 includes the ear-wearable device of embodiment 5, wherein the different types of neural network comprise any two of a feed-forward neural network, a recurrent neural network, a convolutional neural network, and a spiking neural network.

Embodiment 7 includes the ear-wearable device of any of embodiments 1-6, wherein outputs of the selected neural network comprises a set of spectral weights.

Embodiment 8 includes the ear-wearable device of any of embodiments 1-7, further comprising a data interface that allows the ear-wearable device to receive data from a network service, the data interface facilitating selection, via the network service, an additional neural network data object that is added to the plurality of neural network data objects.

Embodiment 9 includes the ear-wearable device of embodiment 8, wherein the additional neural network data objects replaces an existing one of the neural network data objects that is associated with one of the plurality of classifications.

Embodiment 10 includes the ear-wearable device of embodiment 8, wherein the data interface facilitates downloading an additional classification parameter used to identify an additional classification, wherein the additional neural network data object is associated with the additional classification.

Embodiment 11 includes the ear-wearable device of any of embodiments 1-10, wherein the ear-wearable device is operable to: gather usage data on the effectiveness of the plurality of neural network data objects in enhancing the digitized sound signal; couple the ear-wearable device to a network service; send the usage data to the network service; refine or retrain at least one of the plurality of neural network data objects based on the usage data.

Embodiment 12 includes the ear-wearable device of embodiment 11, wherein the ear-wearable device is operable to, via the network service, uploading the refined or retrained neural network data object to replace one or more of the plurality of neural network data objects stored in the persistent memory.

Embodiment 13 is a method, comprising: storing, on a persistent data storage of an ear-wearable device, a plurality of neural network data objects each defining a respective neural network; digitizing a sound signal received from a microphone of the ear-wearable device; classifying an ambient environment of the digitized sound signal into one of a plurality of classifications; based on the classification, selecting one of the neural network data objects to enhance the digitized sound signal; forming an analog signal based on the enhanced digitized sound signal; and reproducing the analog signal via a receiver of the ear-wearable device.

Embodiment 14 includes the method of embodiment 13, wherein at least two of the respective neural networks uses a different input feature set, the method further comprising extracting a different input feature set from the digitized sound signal based on the classification and inputting the different input feature set to the selected neural network data object.

Embodiment 15 includes the method of embodiment 13 or 14, further comprising: converting the digitized sound signal into a frequency domain signal, the classifier and neural network processor operating on the frequency domain signal, the neural network processor producing an enhanced spectrum frequency domain signal; and converting the enhanced frequency domain signal to the enhanced digitized sound signal.

Embodiment 16 includes the method of any of embodiments 13-15, wherein the neural network enhances speech of the digitized sound signal.

Embodiment 17 includes the method of any of embodiments 13-16, wherein at least two of the neural network data objects define different types of neural networks.

Embodiment 18 includes the method of embodiment 17, wherein the different types of neural network comprise any two of a feed-forward neural network, a recurrent neural network, a convolutional neural network, and a spiking neural network.

Embodiment 19 includes the method of any of embodiments 13-18, wherein outputs of the selected neural network comprises a set of spectral weights.

Embodiment 20 includes the method of any of embodiments 13-19, further comprising: coupling the ear-wearable device to a network service; and via the network service, selecting an additional neural network data object that is added to the plurality of neural network data objects.

Embodiment 21 includes the method of embodiment 20, wherein the additional neural network data object replaces an existing one of the neural network data objects that is associated with one of the plurality of classifications.

Embodiment 22 includes the method of embodiment 20, further comprising downloading additional classification parameters used to identify an additional classification, wherein the additional neural network data object is associated with the additional classification.

Embodiment 23 includes the method of any of embodiments 13-22, further comprising: gathering usage data on the effectiveness of the plurality of neural network data objects in enhancing the digitized sound signal; coupling the ear-wearable device to a network service; sending the usage data to the network service; refining or retraining at least one of the plurality of neural network data objects based on the usage data.

Embodiment 24 includes the method of embodiment 23, further comprising, via the network service, uploading the refined or retrained neural network data object to replace one or more of the plurality of neural network data objects stored in the persistent memory.

Embodiment 25 is a system comprising: a network service; and an ear-wearable device, comprising: a persistent memory storing a plurality of neural network data objects each defining a respective neural network; a classifier that classifies an ambient environment of a digitized sound signal into one of a plurality of classifications; a neural network processor that, based on the classification, selects one of the neural network data objects to enhance the digitized sound signal; a second signal processing module that forms an analog signal based on the enhanced digitized sound signal, the analog signal being reproduced via a receiver of the ear-wearable device; and a data interface that allows the ear-wearable device to receive data from the network service, the data interface facilitating updating or replacement of the plurality of plurality of neural network data object.

Embodiment 26 includes the system of embodiment 25, wherein the data interface facilitates selection, via the network service, an additional neural network data object that is added to the plurality of neural network data objects.

Embodiment 27 includes the system of embodiment 26, wherein the additional neural network data object replaces an existing one of the neural network data objects that is associated with one of the plurality of classifications.

Embodiment 28 includes the system of embodiment 27, wherein the data interface facilitates downloading an additional classification parameter used to identify an additional classification, wherein the additional neural network data object is associated with the additional classification.

Embodiment 29 includes the system of any of embodiments 25-28, wherein the ear-wearable device is operable to: gather usage data on the effectiveness of the plurality of neural network data objects in enhancing the digitized sound signal; couple the ear-wearable device to a network service; send the usage data to the network service; refine or retrain at least one of the plurality of neural network data objects based on the usage data.

Embodiment 30 includes the system of embodiment 29, wherein the ear-wearable device is operable to, via the network service, uploading the refined or retrained neural network data object to replace one or more of the plurality of neural network data objects stored in the persistent memory.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of" "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An ear-wearable device, comprising:
   a persistent memory storing a plurality of neural network data objects each defining a respective neural network;
   a classifier that classifies an ambient environment of a digitized sound signal into one of a plurality of classifications;
   a neural network processor that, based on the classification, selects one of the neural network data objects to enhance the digitized sound signal; and
   a second signal processing module that forms an analog signal based on the enhanced digitized sound signal, the analog signal being reproduced via a receiver of the ear-wearable device.

2. The ear-wearable device of claim 1, wherein at least two of the respective neural networks uses a different input feature set, the ear-wearable device further comprising a feature processor that extracts a different input feature set from the digitized sound signal based on the classification and inputs the different input feature set to the selected neural network data object.

3. The ear wearable device of claim 1, further comprising:
   a transform processor that converts the digitized sound signal into a frequency domain signal, the classifier and neural network processor operating on the frequency domain signal, the neural network processor producing an enhanced spectrum frequency domain signal; and
   an inverse transform processor that converts the enhanced frequency domain signal to the enhanced digitized sound signal.

4. The ear-wearable device of claim 1, wherein the neural network enhances speech of the digitized sound signal.

5. The ear-wearable device of claim 1, wherein at least two of the neural network data objects define different types of neural networks.

6. The ear-wearable device of claim 5, wherein the different types of neural network comprise any two of a feed-forward neural network, a recurrent neural network, a convolutional neural network, and a spiking neural network.

7. The ear-wearable device of claim 1, wherein outputs of the selected neural network comprises a set of spectral weights.

8. The ear-wearable device of claim 1, further comprising a data interface that allows the ear-wearable device to receive data from a network service, the data interface facilitating selection, via the network service, an additional neural network data object that is added to the plurality of neural network data objects.

9. The ear-wearable device of claim 8, wherein the additional neural network data objects replaces an existing one of the neural network data objects that is associated with one of the plurality of classifications.

10. The ear-wearable device of claim 8, wherein the data interface facilitates downloading an additional classification parameter used to identify an additional classification, wherein the additional neural network data object is associated with the additional classification.

11. The ear-wearable device of claim 1, wherein the ear-wearable device is operable to:
    gather usage data on the effectiveness of the plurality of neural network data objects in enhancing the digitized sound signal;
    couple the ear-wearable device to a network service;
    send the usage data to the network service;
    refine or retrain at least one of the plurality of neural network data objects based on the usage data.

12. The ear-wearable device of claim 11, wherein the ear-wearable device is operable to, via the network service, uploading the refined or retrained neural network data object to replace one or more of the plurality of neural network data objects stored in the persistent memory.

13. A method, comprising:
    storing, on a persistent data storage of an ear-wearable device, a plurality of neural network data objects each defining a respective neural network;
    digitizing a sound signal received from a microphone of the ear-wearable device;
    classifying an ambient environment of the digitized sound signal into one of a plurality of classifications;
    based on the classification, selecting one of the neural network data objects to enhance the digitized sound signal;
    forming an analog signal based on the enhanced digitized sound signal; and
    reproducing the analog signal via a receiver of the ear-wearable device.

14. The method of claim 13, wherein at least two of the respective neural networks uses a different input feature set, the method further comprising extracting a different input feature set from the digitized sound signal based on the classification and inputting the different input feature set to the selected neural network data object.

15. The method of claim 13, further comprising:
    converting the digitized sound signal into a frequency domain signal, the classifier and neural network processor operating on the frequency domain signal, the neural network processor producing an enhanced spectrum frequency domain signal; and converting the enhanced frequency domain signal to the enhanced digitized sound signal.

16. A system comprising:
a network service; and
an ear-wearable device, comprising:
   a persistent memory storing a plurality of neural network data objects each defining a respective neural network;
   a classifier that classifies an ambient environment of a digitized sound signal into one of a plurality of classifications;
   a neural network processor that, based on the classification, selects one of the neural network data objects to enhance the digitized sound signal;
   a second signal processing module that forms an analog signal based on the enhanced digitized sound signal, the analog signal being reproduced via a receiver of the ear-wearable device; and
   a data interface that allows the ear-wearable device to receive data from the network service, the data interface facilitating updating or replacement of the plurality of plurality of neural network data object.

17. The system of claim 16, wherein the data interface facilitates selection, via the network service, an additional neural network data object that is added to the plurality of neural network data objects, wherein the additional neural network data object replaces an existing one of the neural network data objects that is associated with one of the plurality of classifications.

18. The system of claim 17, wherein the data interface facilitates downloading an additional classification parameter used to identify an additional classification, wherein the additional neural network data object is associated with the additional classification.

19. The system of any of claim 16, wherein the ear-wearable device is operable to:
   gather usage data on the effectiveness of the plurality of neural network data objects in enhancing the digitized sound signal;
   couple the ear-wearable device to a network service;
   send the usage data to the network service;
   refine or retrain at least one of the plurality of neural network data objects based on the usage data.

20. The system of claim 19, wherein the ear-wearable device is operable to, via the network service, uploading the refined or retrained neural network data object to replace one or more of the plurality of neural network data objects stored in the persistent memory.

* * * * *